E. SCHNEIDER.
ENDLESS TRACK VEHICLE.
APPLICATION FILED SEPT. 6, 1917.
1,376,648.
Patented May 3, 1921.
4 SHEETS—SHEET 1.
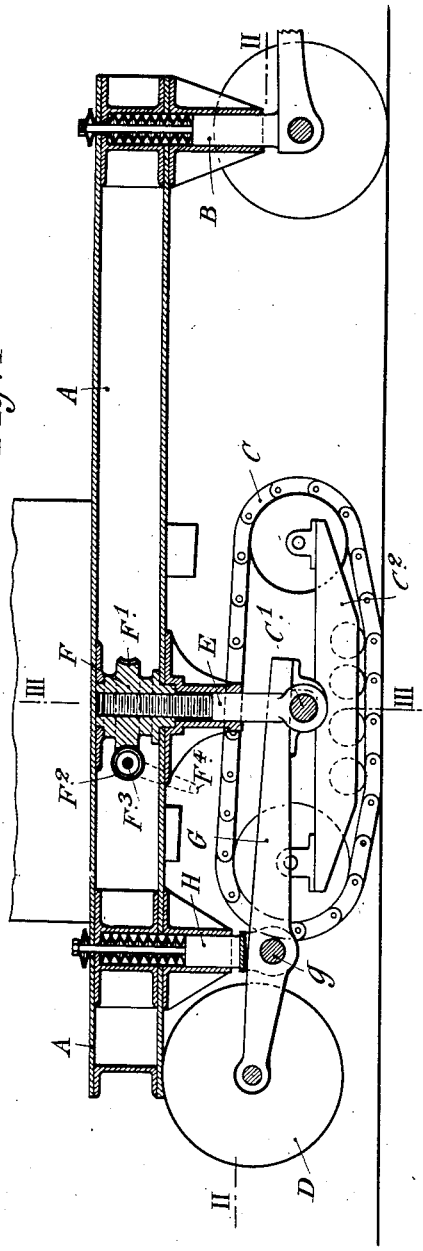
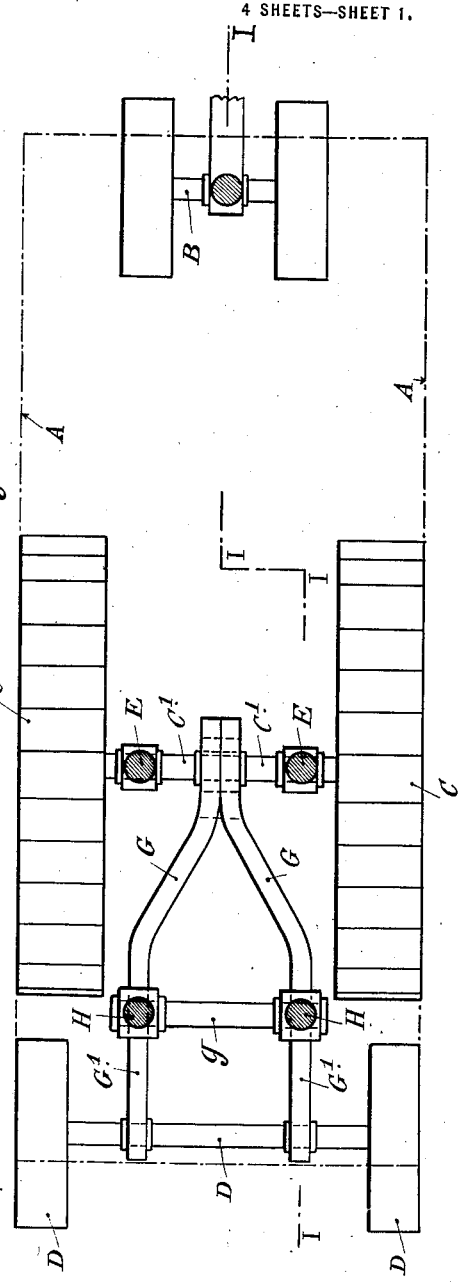
Inventor.
Eugene Schneider
by
Mauro, Cameron, Lewis & Massie,
Attorneys E. SCHNEIDER.
ENDLESS TRACK VEHICLE.
APPLICATION FILED SEPT. 6, 1917.
1,376,648.
Patented May 3, 1921.
4 SHEETS—SHEET 2.
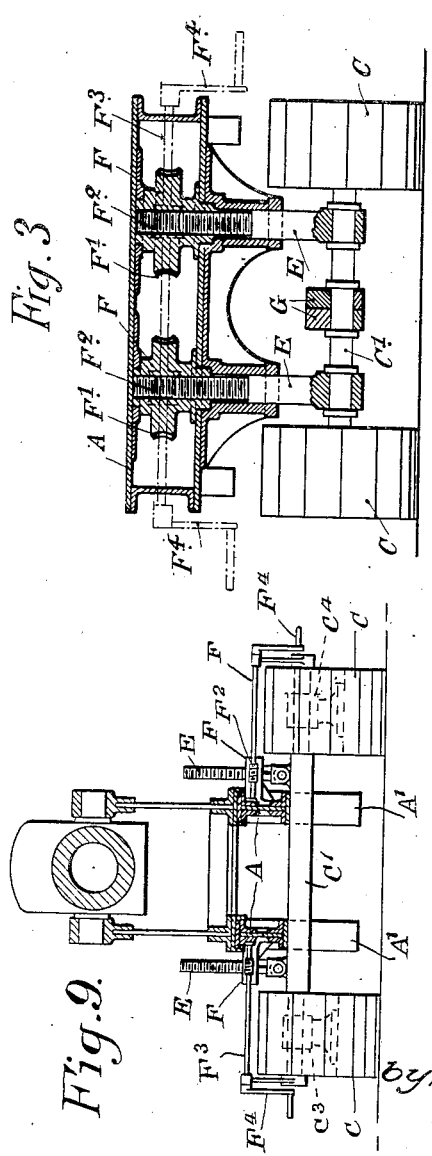
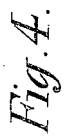
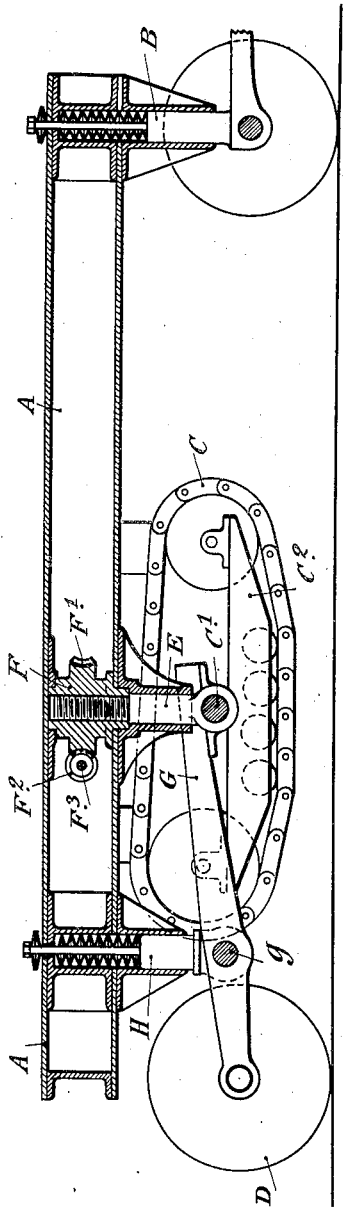

E. SCHNEIDER.
ENDLESS TRACK VEHICLE.
APPLICATION FILED SEPT. 6, 1917.

1,376,648.

Patented May 3, 1921.
4 SHEETS—SHEET 3.

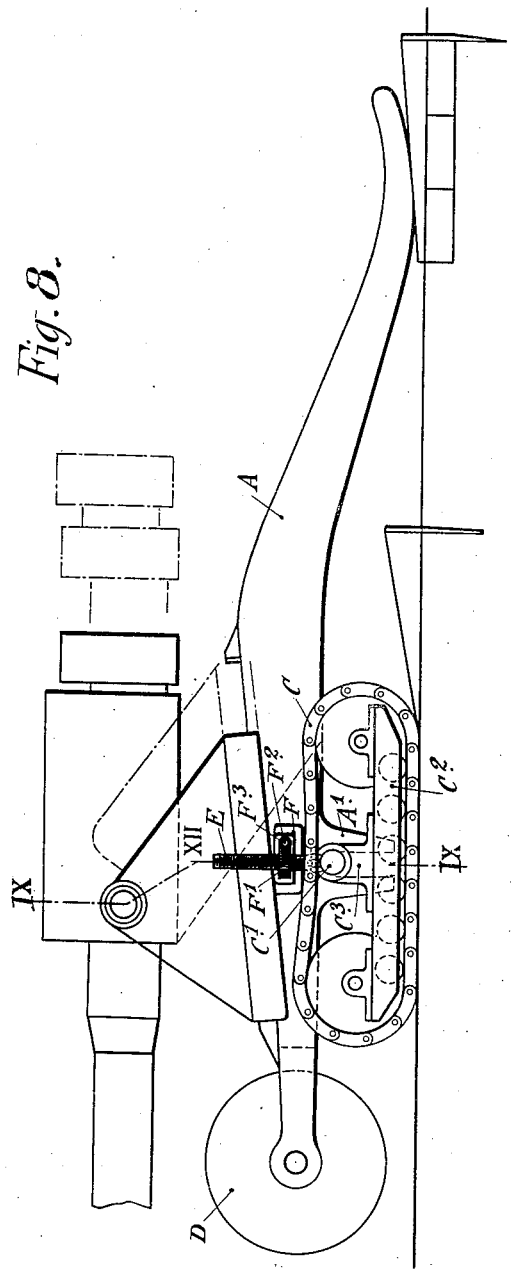

UNITED STATES PATENT OFFICE.

EUGÈNE SCHNEIDER, OF LE CREUZOT, FRANCE, ASSIGNOR TO SCHNEIDER & CIE., OF PARIS, FRANCE, A LIMITED JOINT-STOCK COMPANY OF FRANCE.

ENDLESS-TRACK VEHICLE.

1,376,648.     Specification of Letters Patent.     Patented May 3, 1921.

Application filed September 6, 1917. Serial No. 189,950.

*To all whom it may concern:*

Be it known that I, EUGÈNE SCHNEIDER, a citizen of the French Republic, and a resident of Le Creuzot, Saône-et-Loire, France, have invented a new and useful Improvement in Endless-Track Vehicles, which invention is fully set forth in the following specification.

Endless tracks have received numerous applications for enabling heavy vehicles to roll over rough ground and ground that is not very firm.

The principal drawback of such endless tracks is the great inconvenience occasioned thereby when the vehicle has to roll over hard ground. On such ground the endless tracks are subjected to shocks which damage the joints and cause rapid wear. Such endless tracks also hinder the speed of travel over hard ground because in such a case it would be possible to increase the speed of such travel by employing exclusively the usual means of rolling.

This invention has for its object to provide an improved combination of means for remedying those drawbacks. The invention consists substantially in a combination of endless tracks capable of being raised relatively to the carriage framing, with auxiliary wheeled axles, which latter may also be arranged to be raised relatively to the carriage framing. The arrangement is such that the vehicle is rendered capable of traveling either by means of the endless tracks alone, or by means of the auxiliary wheeled axles alone, or by means of both wheeled axles and endless tracks at the same time.

Several forms of construction and application of this invention are illustrated in the accompanying drawings in which:—

Figures 1 to 4 illustrate one embodiment. In these figures:—

Fig. 1 is a vertical section on the line I—I of Fig. 2.

Fig. 2 is a horizontal section on the line II—II of Fig. 1.

Fig. 3 is a vertical cross section on the line III—III of Fig. 1.

In these three figures the parts of the raisable endless tracks combined with an auxiliary wheeled axle, are shown in position for rolling over yielding or rough ground.

Fig. 4 is a vertical section similar to Fig. 1 showing the parts in the position for rolling over hard ground.

Figs. 5 to 9 illustrate an embodiment of this invention applied by way of example to a trail gun carriage in which:—

Figure 5:
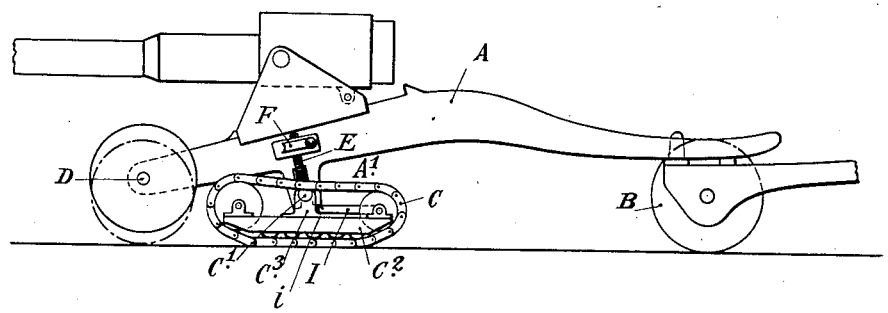
Figure 6:
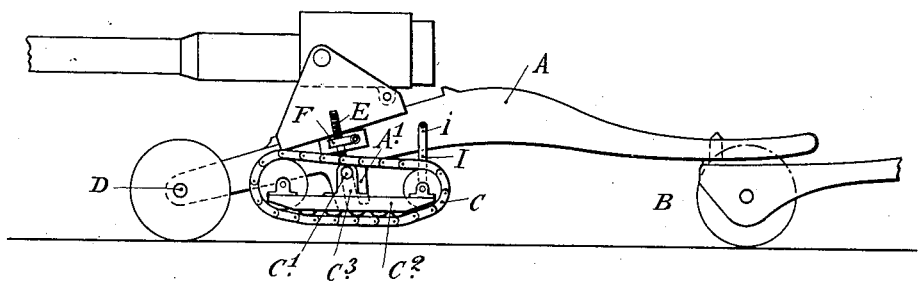
Figure 7:
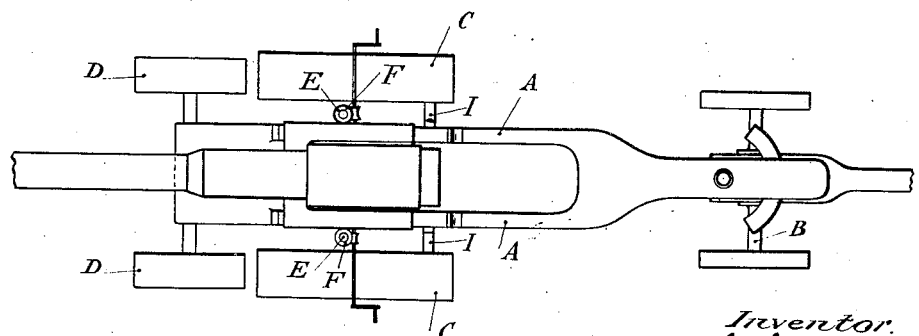

Figs. 5 and 6 are diagrammatic side elevations showing the improved apparatus arranged for transporting the gun over yielding ground and hard ground respectively.

Fig. 7 is a plan.

Fig. 8 is a side elevation drawn to a larger scale showing the apparatus with the gun run out for firing.

Fig. 9 is a vertical cross section on the line IX—IX of Fig. 8.

Referring first to Figs. 1 to 4, A is a vehicle under-framing or a platform or any other member of a gun carriage for a gun of large caliber. This carriage framing rests at one end upon a fore axle B which may be independent of the vehicle or may be permanently connected thereto.

The rear supporting means is constituted according to this invention by two endless tracks C which are raisable relatively to the carriage framing A or gun carriage member, and combined with an auxiliary wheeled axle D. For the purpose of raising the endless tracks C, these are carried by the members of screw-jacks or equivalent devices, the complementary elements of which are located on the carriage framing.

In the example shown, the cross member $C^1$ on which are pivoted the trucks $C^2$ of the two endless tracks, is supported by screw-threaded rods E engaging in nuts F that are movable in the framing A. The rising and descent of the rods E may be effected for example by the rotation in the desired direction of helical wheels $F^1$ actuated by means such as shown in the figure, which comprises worms $F^2$ fixed on a shaft $F^3$ journaled in the framing, and adapted to be operated by means of hand cranks $F^4$.

In this embodiment, the cross member $C^1$ connecting the two endlesss tracks C, C together and the auxiliary wheeled axle D are mounted on the two ends of a rocking beam G—$G^1$, the fulcrum or pivoted axle $g$ of which is carried by the framing or by elastic suspension rods H, such as are shown in Figs. 1, 2 and 4.

It will be readily understood that according to the position which is given to the suspension rods E relatively to the framing A, the vehicle may be caused to bear upon the endless tracks C (as shown in Figs 1 and 3), or upon the wheels of the auxiliary wheeled axle D (as shown in Fig. 4).

In the embodiment illustrated by Figs. 5 to 9, the sides A of the trail rest with their suitably extended forward ends upon the axle D of a rear wheeled axle. They are provided at a point intermediate of their length with horn plates A¹, which engage the cross member C¹ connecting the trucks C² of the endless tracks C. The raising and lowering of the endless tracks C relatively to the sides A, are produced by means of screw-jacks whose elements F, E, are carried respectively by the said sides and by the cross member C¹. The latter may be journaled in zearings C³ fixed to the trucks C². According to the relative position given to the elements of the screw-jacks, the trail A may be caused to bear upon a front wheeled axle B and upon the endless tracks C, the rear wheeled axle D being employed at the same time as the endless tracks (which position is indicated in dash and dot lines in Fig. 5), or it may be raised (as shown in full lines in Fig. 5). As a further alternative the endless tracks may be raised and hooked up by means of rods I to allow of the carriage rolling over hard ground (Fig. 6). The gun when run out for firing may rest upon the endless tracks C and upon the rear wheeled axle, the training of the gun being effected by shifting the tail of the trail (Figs. 8 and 9).

The raising of the gun carriage for connecting to the front wheeled axle is effected by turning the trail around the axle of the rear wheeled axle. In this movement the endless tracks are raised, and in rising rock on the cross member C which is raised by the screw-jack elements E.

What I claim is:—

1. In an endless track vehicle having a front wheeled axle, in combination with a pair of trucks carrying endless tracks, a cross-member on which are pivoted the trucks to oscillate in vertical planes parallel to the longitudinal axis of the vehicle, screw-jack elements carrying said cross-member with their complementary elements carried by the underframing of the vehicle, said screw-jack elements being operative to raise and lower the trucks relatively to the underframing, and an auxiliary rear wheeled axle carried by said underframing, said auxiliary wheeled axle operating to carry the load when the trucks are raised from the ground by the screw-jack elements.

2. In an endless track vehicle having a front wheeled axle, the combination of a pair of raisable endless tracks, a cross member connecting said endless tracks carried by screw-jack elements, of which the complementary elements are carried by the underframing of the vehicle, and an auxiliary rear wheeled axle, carried by one arm of a rocking beam fulcrumed elastically on said underframing, the other arm of said rocking beam being articulated to said cross connecting member.

3. In an endless track vehicle having a front wheeled axle, the combination of a pair of raisable endless tracks, a cross member connecting said endless tracks carried by screw-jack elements, of which the complementary elements are carried by the underframing of the vehicle, and an auxiliary rear wheeled axle, carried by one arm of a rocking beam fulcrumed on said underframing, the other arm of said rocking beam being articulated to said cross connecting member.

4. In an endless track vehicle having a front wheeled axle, the combination of a raisable endless track, means for raising and lowering the endless track relative to the underframing of the vehicle, an auxiliary wheeled axle, and a rocking beam fulcrumed to the underframing carrying the auxiliary wheeled axle at one end and articulated at the other end to the endless track so that the raising and lowering of the latter will lower and raise the auxiliary wheeled axle.

In testimony whereof I have signed this specification.

EUGÈNE SCHNEIDER.